US009135586B2

(12) United States Patent
Balko et al.

(10) Patent No.: US 9,135,586 B2
(45) Date of Patent: Sep. 15, 2015

(54) SYSTEM FOR DYNAMIC PARALLEL LOOPING OF REPETITIVE TASKS DURING EXECUTION OF PROCESS-FLOWS IN PROCESS RUNTIME (75) Inventors: Sören Balko, Weinheim (DE); Volker Lehmann, Leimen (DE); Philipp Sommer, Heidelberg (DE); Boris Klinker, Karlsruhe (DE)

(73) Assignee: SAP SE, Walldorf (DE)

( * ) Notice: Subject to any disclaimer, the term of this patent is extended or adjusted under 35 U.S.C. 154(b) by 345 days.

(21) Appl. No.: 12/914,128

(22) Filed: Oct. 28, 2010

(65) Prior Publication Data
US 2012/0110583 A1 May 3, 2012

(51) Int. Cl.
*G06F 9/46* (2006.01)
*G06Q 10/06* (2012.01)
*G06F 9/48* (2006.01)

(52) U.S. Cl.
CPC .............. *G06Q 10/06* (2013.01); *G06F 9/4843* (2013.01); *G06F 9/485* (2013.01); *G06F 9/4881* (2013.01); *G06Q 10/0633* (2013.01); *G06Q 10/06311* (2013.01); *G06Q 10/06316* (2013.01)

(58) Field of Classification Search
CPC .............. G06Q 10/06; G06Q 10/6316; G06Q 10/0633; G06Q 10/06311; G06F 9/4843; G06F 9/485; G06F 9/4881; G06F 9/4883

USPC .................................. 718/102; 707/7.27, 348
See application file for complete search history.

(56) References Cited

U.S. PATENT DOCUMENTS

| | | | | |
|---|---|---|---|---|
| 5,937,388 A * | 8/1999 | Davis et al. | ................... | 705/7.26 |
| 6,601,233 B1 * | 7/2003 | Underwood | ................... | 717/102 |
| 7,168,077 B2 * | 1/2007 | Kim et al. | ...................... | 718/106 |
| 7,313,601 B2 * | 12/2007 | Fischer et al. | ................. | 709/217 |
| 7,441,240 B2 * | 10/2008 | Amano et al. | ................ | 718/102 |
| 7,444,635 B2 * | 10/2008 | Lehtinen | ........................ | 718/104 |
| 8,036,874 B2 * | 10/2011 | Igarashi | .......................... | 703/22 |
| 8,069,439 B2 * | 11/2011 | Shukla et al. | ................... | 717/125 |
| 2003/0195785 A1 * | 10/2003 | Thalangara et al. | ............... | 705/8 |
| 2004/0162741 A1 * | 8/2004 | Flaxer et al. | ....................... | 705/7 |
| 2006/0015873 A1 * | 1/2006 | Dettinger et al. | ............. | 718/102 |
| 2010/0306000 A1 * | 12/2010 | Green et al. | ....................... | 705/7 |
| 2011/0296420 A1 * | 12/2011 | Pegushin et al. | .............. | 718/102 |

* cited by examiner

*Primary Examiner* — Meng An
*Assistant Examiner* — Abu Ghaffari (57) ABSTRACT

Systems and methods for dynamic parallel looping in process runtime environment are described herein. A currently processed process-flow instance of a business process reaches a dynamic loop activity including a repetitive task to be executed with each loop cycle. A predefined expression is evaluated on top of the current data context of the process-flow instance to discover a number of loop cycles for execution within the dynamic loop activity. A number of parallel activities corresponding to the repetitive task recurrences are instantiated and executed in parallel. The results of the parallel activities are coordinated to confirm that the dynamic loop activity is completed.

16 Claims, 5 Drawing Sheets

SYSTEM FOR DYNAMIC PARALLEL LOOPING OF REPETITIVE TASKS DURING EXECUTION OF PROCESS-FLOWS IN PROCESS RUNTIME

TECHNICAL FIELD

The field relates generally to data processing and digital processing systems. More specifically, the field is related to execution of business processes within a multi computer systems environment.

BACKGROUND

The business process management is an important activity, especially for big organizations, including enterprises, government administrations, non-profit organizations, etc. The development, implementation and control of simpler and more cost efficient business processes is a major success factor for any organization. The introduction of more advanced software and hardware solutions continuously expands the possibilities for improvements in the business processes adopted by an organization. In software engineering, various stakeholders, e.g., managers, business analysts, process designers, software developers, etc., are involved in business process modeling and business process automation. Some of their main goals are to create, implement and support business process models with improved quality and efficiency within an organization.

Different vendors provide various software tools to facilitate the work of the stakeholders in business process modeling. There is a mutual interest among the parties involved in process modeling to use common and concise description of the business processes which are lucid, inside and outside an organization. There are a number of workflow pattern definitions developed by different vendors or organizations to set semantics for business process modeling. Business process modeling notation (BPMN) maintained by Object Management Group organization is broadly recognized as a standard workflow pattern for business process modeling. The standardized and comprehensive descriptions of business process models increase the efficiency of the business processes life-cycle across the different stakeholders. Furthermore, the business process models compliant with a standard workflow pattern may be easily, and even automatically, translated to executable instructions in a runtime computer system environment. For example, a standard business process description that is, for e.g., BPMN compliant, could be compiled to a set of trigger network instructions, executable by a rule based engine of a runtime computer system environment.

Business processes of an organization frequently include execution of repetitive tasks. Often, it is desirable for such tasks to be performed in parallel for reasons such as good throughput, small overall process turnaround times, and improved resource utilization. For example, a business process-flow execution may involve processing of data batches in a computer system running a number of concurrent processors. Thus, a number of repetitive task recurrences could be routed to different processors at the same time. However, the number of repetitive task recurrences, and hence the number of parallel execution threads, can be determined only during runtime, based on the process-flow data context. For example, the precise number of tasks to be executed may correspond to the cardinality of a dynamically evaluated list-valued expression. Therefore, it is hard to automatically translate a multi-instance activity of a business process model to a series of instructions executed in parallel.

SUMMARY

Various embodiments of systems and methods for dynamic parallel looping in process runtime environment are described herein. An execution of a process-flow instance of a business process in a process runtime environment reaches a dynamic loop activity. The dynamic loop activity includes a repetitive task to be recurrently executed with each loop cycle. In one aspect, a predefined expression is evaluated on top of the current data context of the process runtime environment, and respectively, on top of the data context of the process-flow instance. The evaluation of the expression returns a number of recurrent cycles to be executed for the dynamic loop activity. In another aspect, a number of parallel activities corresponding to the repetitive task recurrences are instantiated and executed in parallel in the process runtime environment. In yet another aspect, the results of the parallel activities are coordinated to confirm an accomplishment of the dynamic loop activity. Afterwards, the process-flow execution continues with a successive task following the dynamic loop activity, if any.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of techniques for dynamic parallel looping in business process runtime environment are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

In this specification, a "trigger network" may be interpreted an organized set of event-condition-action rules. The term "event-condition-action" (ECA) refers to a structure of active rules in computer systems adopting event-driven architectures. The event part of an ECA rule specifies a trigger invoking the rule. The condition part of the ECA rule typically includes a logical expression which is evaluated when the rule is invoked. The action part may contain one or more operations executed when the ECA rule is invoked and when the condition is satisfied. Usually, ECA rules are processed by business rule engines implemented in runtime computer system environments. In one embodiment, the business rule engines are based on "Rete" algorithms. The ECA rules operate within a current data context of a runtime environment, where the conditions depend on the context, and the actions involve updates of one or more data object instances.

In one embodiment, a process-flow is characterized by execution of a number of successive activities. The activities and the order of their execution are defined by a business process model. When the business process is modeled using a standard pattern, e.g., compliant with the BPMN semantics, it can be translated or compiled automatically to a series of ECA rules. These series of ECA rules could be executed in a runtime environment by a rule engine forming a process-flow instance of the business process.

A business process model may include one or more dynamic loop activities to address repetitive tasks. In this document, a repetitive or recurring task refers to a business process activity that is executed more than one time, e.g., like a batch job. Often, at least two of the separate recurrences of the repetitive task could be executed in parallel. In one embodiment, such a compound loop activity is translated to a set of ECA rules.

Generally, the number of recurrences of a repetitive task to be executed in parallel within a process-flow can be determined only based on a current runtime data context. Therefore, according to one embodiment, a first rule of the set of ECA rules corresponding to a dynamic loop activity evaluates the number of recurrent executions of the repetitive task. Another ECA rule sequentially iterates over the repetitive task to instantiate parallel execution threads for each task recurrence. In one embodiment, the number of the instantiated threads running in parallel may depends on the available system resources of the runtime environment. Additionally, yet another ECA rule has to verify that the repetitive task executions of the dynamic loop activity are completed, hence, the business process execution may continue with a successive activity.

In one embodiment, the number of recurrences of a repetitive task of a business process activity is discovered by evaluating a predefined expression based on the current execution data context of the corresponding process-flow instance. The current data context may include parameters like current data object values, current status of application variables, current system states, etc. The predefined expression may be specified or modeled as part of the business process model. An exemplary triggering condition for evaluating the expression occurs when an execution pointer, e.g. a token, assigned to a process-flow instance reaches the dynamic loop activity, and the set of corresponding ECA rules is generated, or becomes active.

For example, a payroll business process may include execution of separate money transfers to an account for every employee of a company. In one embodiment, the money transfers could be executed in parallel to improve system efficiency. However, the number of employees, and respectively, the number of the parallel money transfers to be instantiated cannot be predicted in advance during the payroll business process modeling. Certain parameters change dynamically, and may vary for each payroll period, e.g., the current number of employees, the current salary per employee for the period, employee account numbers, etc. The values for these parameters are generated or provided within the execution context of the process-flow instance of the payroll business process. Based on the context, and the current parameters' values, a predefined expression may evaluate the number of money transfers, and the exact characteristics of each money transfer. Additional parameters, also determining the number of concurrently executed money transfers may be related to the currently employed system resources, like, number of processors, current load, maximum parallel execution threads, etc.

In one embodiment, the rules engine executing a dynamic loop activity of a process-flow spawns a number of separate subflow instances based on the corresponding ECA rules. Each of the instantiated subflows carries one recurrence of the repetitive task. In other words, each subflow is a cycle of the dynamic loop activity, where all or some of the different loop cycles are executed in parallel. An instantiated subflow encapsulates process activities corresponding to the repetitive task included in the dynamic loop activity. The subflows are child objects of the main process-flow instance, and may have access to the current data context of the process-flow, as well as access to other child objects of the process-flow instance. A subflow may contain compound work process activities, including dynamic parallel activities. Respectively, one or more subflows may be instantiated within a subflow, forming a nested structure of subflow instances.

Whenever a subflow reaches its end event, it is marked as finished. The whole loop activity is finished if all instantiated subflows have been marked as finished, and no more recurrences of the repetitive task are required. When a subflow corresponding to a repetitive task recurrence is completed, a response may be generated to carry result status or result data from the subflow execution. In one embodiment, a rule from the set of ECA rules corresponding to the dynamic loop activity increments a counter and compares it with the estimated total number of repetitive task recurrences. The execution of the parent process-flow instance may continue with processing a successive activity following the dynamic loop activity only after the counter has reached the cardinality of the repetitive task recurrences.

An event propagation mechanism may traverse events generated in a subflow instance up the calling stack until matching event handler is reached. For certain types of events, e.g., exceptions, this mechanism may forcefully abort any subflow instance that the event propagation passes in its way up the calling stack. This way, a consistent handling of erroneous situations is ensured without further execution of malicious process fragments. A "calling stack" is the sequence of nested subflows.

In one embodiment, a completion condition is evaluated when a subflow instance completes. When the condition is satisfied, the remaining subflow instances are instantly completed, e.g., aborted, and the parent workflow process continues with the successive task. This way, a premature completion of a dynamic loop activity is possible, when a success criterion is reached before all recurrences of the corresponding repetitive task being processed. A flow condition may be evaluated similarly to the completion condition to trigger passing one or more extra tokens to one or more successive activities in the parent process-flow instance, thus, triggering subsequent process tasks without aborting the running subflow instances.

The different embodiments may cover a wide array of general workflow pattern constructs, namely, "Multiple Instances without Synchronization", "Multiple Instances with a-priori Design Time Knowledge", "Multiple Instances with a-priori Runtime Knowledge", "Cancel Multiple Instance Activity", "Complete Multiple Instance Activity", "Static Partial Join for Multiple Instances", "Cancelling Partial Join for Multiple Instances", etc. The proposed embodiments also can provide native support for "Multiple Instance" activities and "ForEach" structured activities in BPMN and Business Process Execution Language (BPEL), respectively.

Figure 1:
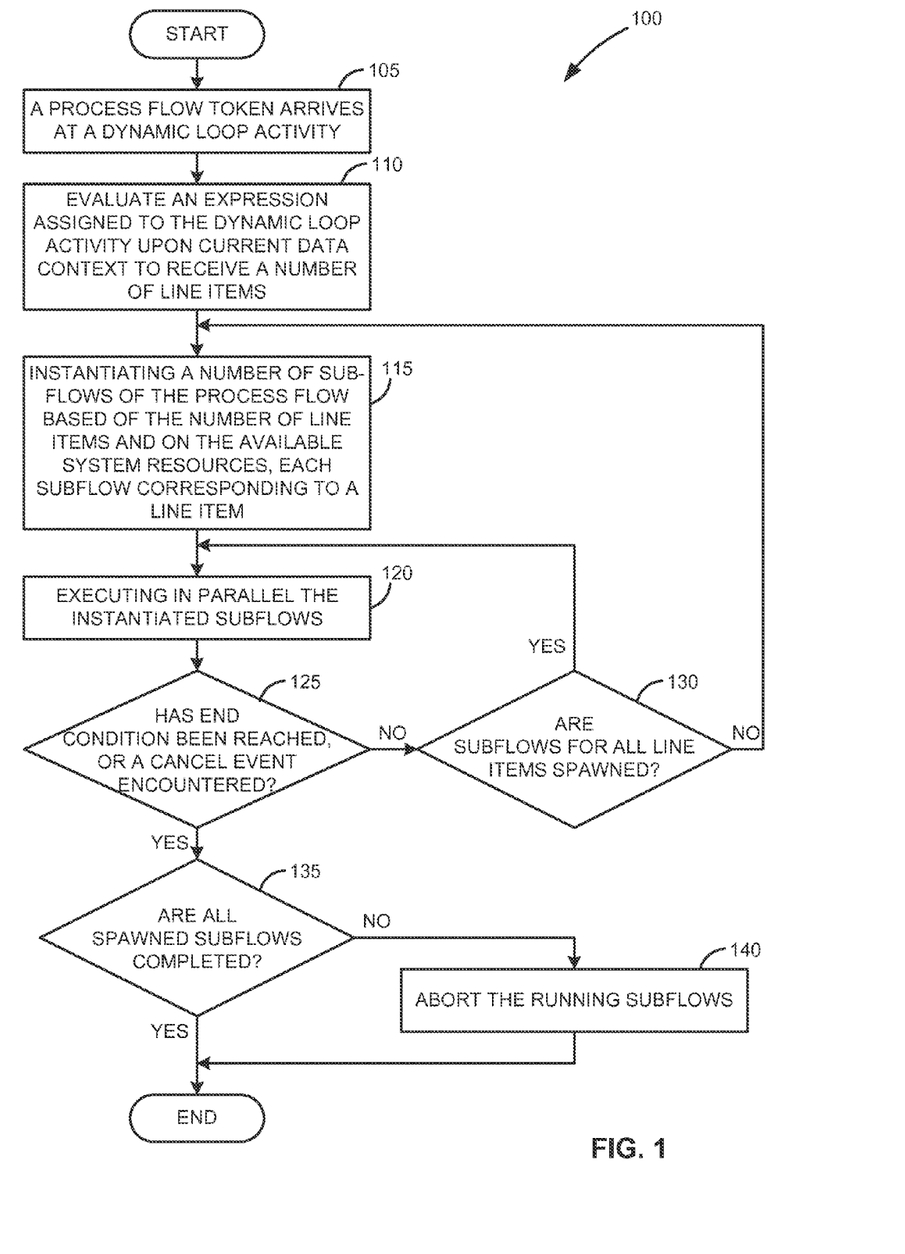
FIG. 1 illustrates a process for dynamic parallel looping in process runtime, according to one embodiment.

FIG. 1 shows process 100 for dynamic parallel looping in process runtime environment system environment. In one embodiment, an instance of a process-flow is executed by a rule-based, stateful transition execution engine implemented in the runtime environment. The process-flow may be defined based on a consistent workflow pattern by a business process model. The rule-based engine may be based on a "Rete" type trigger network processor built-in underneath a Business Process Management System (BPMS) runtime.

At 105, a token showing the progress of the process-flow instance execution arrives at a dynamic loop activity. The dynamic loop activity is characterized by a flexible number of recurrent executions of a repetitive task or group of tasks. At 110, a predefined expression assigned to the dynamic loop activity is evaluated upon the current data context of the process-flow instance to receive the number of recurrences of the repetitive task.

In one embodiment, the evaluation of the assigned expression leads to a list-valued result assigned to a temporary status variable, e.g., to a "batch" variable. The list-valued result is split into a number of single line items. Each line item indicates that a cycle, e.g., a subflow, has to be spawned for this line item. The number of cycles is determined by the number of line items, where the runtime environment can consume one or more line items depending on available system resources to start processing a cycle. The batch variable may be a list-based object, and each entry of this list-based object may represent a line item corresponding to a particular recurrence of the repetitive task. The line items may store particular parameters for the execution of the corresponding task recurrences, e.g., money transfer amount, receiving account, etc. Further, the process-flow token may be put in a waiting state to signal that the dynamic loop activity is currently being executed. The execution of the process-flow instance will not continue with processing any successive activity of the process-flow until the token is changed back to a regular state.

At 115, a flexible number of subflows of the process-flow instance are simultaneously instantiated based on the number of line items. Each instantiated subflow corresponds to a line item of the list-based object. In one embodiment, a number of parallel threads are started in the process runtime to execute the instantiated subflows in parallel. The number of the threads may depend on the currently available system resources. The executions of the line items in subflows running within parallel threads have to be coordinated (e.g., harmonized or synchronized) upon completion, before performing any successive tasks in the process-flow instance.

In one embodiment, the underlying ECA rule responsible for the spawning of the subflows makes use of a regular subflow start mechanism of the BPMS runtime. The outer, e.g., parent, process-flow instance generates a "request" status variable (e.g., the line item) which triggers a new subflow instance. In effect, the ECA rule creates as many subflow instances as there are line items in the batch, and each line item is uniquely associated to one subflow instance. At 120, the instantiated subflows are executed in parallel using the regular subflow execution mechanism implemented in the runtime. The resource management capabilities of the underlying state transition engine may provide for thread pooling to process a finite number of line items simultaneously.

At 125 it is verified whether an end condition has been reached, or if a cancel event has been encountered. When neither of these provisions has been registered, the process 100 verifies at 130 whether subflows for all line items have been spawned. Depending on the result of the verification, the process 100 either goes back to 115 to instantiate additional subflows for the line items with no corresponding subflows, or goes back to 120 to continue the parallel execution of the instantiated subflows.

When an end condition or a cancel event is encountered, process 100 verifies at 130 whether all spawned subflows have been completed. At 140, any subflows that are still running are aborted. The end condition may be reached when the number of successfully completed subflows equals the number of the corresponding line items. Alternatively, an end expression may be evaluated when a subflow is completed, and, based on the result, the end condition may be triggered. A cancel event may occur due to an error, an exception, malfunction, user cancellation, etc., encountered during a subflow execution. In order to avoid impartial or erroneous loop activity execution, the running subflows are aborted. Afterwards, the execution token of the process-flow instance may be updated to its regular state, and a successive activity, if any, may be processed.

Figure 2:
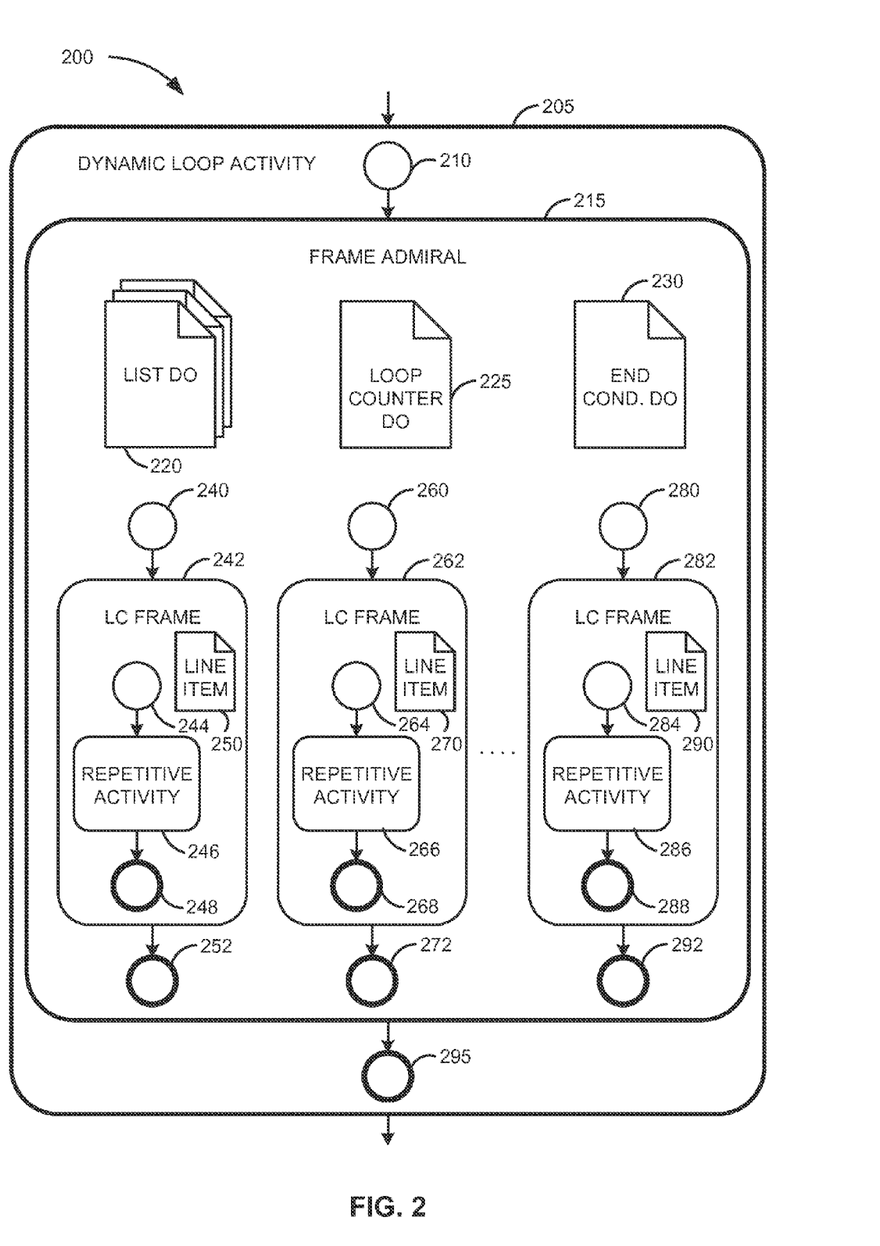
FIG. 2 is a block diagram illustrating dynamic parallel looping in a process-flow instance, according to one embodiment.

FIG. 2 is a block diagram 200 showing a dynamic parallel looping in a process-flow instance. An execution of a process-flow instance reaches a dynamic loop activity 205. In one embodiment, the dynamic loop activity 205 is a compound activity of a business process model which requires execution of a number of recurring tasks or activities. Thus, the dynamic loop activity 205 can be broken down into a number of subordinate activities. In one embodiment, the subordinate activities could be executed as subflows embedded within the data contexts of the process-flow instance, e.g., within the dynamic loop activity 205.

The embedded subflows are contained by the outer process-flow instance which allows tight integration with the process execution context. For example, the embedded subflows may have direct access to any data objects instantiated within their parent, e.g. within the process-flow instance containing the subflows. Further, a terminating end event in a subflow may also terminate its parent process-flow instance, and respectively all other parallel subflows instantiated in the parent process-flow instance. A subflow instance may contain further embedded subflow instances, allowing hierarchical structures of embedded subflows. In one embodiment, a subflow spawns with its own local data context, autonomous from the data contexts of the subflow instances on the same hierarchical level.

In one embodiment, a frame object is generated when the execution of the process-flow instance reaches an activity requiring instantiation of an embedded subflow. The frame object may be an instance of a special frame class similar to the process-flow class defined in the runtime. The frame class provides support for multiple subflow instances spawned in parallel, and for hierarchical subflow nesting in the process-flows. Additionally, the tokens showing the progress of a process-flow execution may include an additional attribute to point to a specific frame instance a token is related to. A frame object should live as long as it has directly associated tokens, or as long as it has a child frame instance, then, the frame object should be destroyed to minimize memory consumption.

In one embodiment, every frame instance is connected to its direct child frame instances (if any) with a join, matching the parent attribute of the child frame to the parent instance. The left inhibitor of this join (i.e., no child instance matching) is connected to all token objects, joining the frame attribute of the token and the frame instance. The right inhibitor of this join (i.e., no token instance matching on this frame) connects to a target node that deletes the frame instance. The last frame in a hierarchy has to be handled slightly different. As there are no child frames, it is directly connected to a join node which takes the token instances and the frame as input. This join also connects to a deletion target on the right inhibitor that leads to the deletion of this frame as soon as there is no more token associated. Subsequently this will then trigger the deletion of all parent frames if they have no other existing child frame instances and no tokens associated.

The data objects of the embedded subflows are in need of a different treatment. They should be cleaned up as soon as possible if they are not needed anymore. Their owner attribute points to the frame instance instead of the process instance. Those data objects are connected to a join with their owner frame matching the data object owner and the frame instance. The right inhibitor which indicates an existing data object which points to a frame owner that does not exist anymore will connect to a deletion target node that cleans up the data object. Termination of an embedded subflow also terminates all children process instances previously called as referenced subflows (including task instances). All sub instances have to be terminated as well.

In one embodiment, the concept of a global context join cascade is extended to support also the frame approach as convenience in business process model compiling, and for simplicity of the trigger network rule engine as well. For every frame a context cascade is generated for its direct data objects. Those context join cascades are used to be able to easily project all data objects that are necessary for a mapping by just connecting a swizzle node to one join node that already provides all needed data objects. In case of a frame there has to be one additional join node. It connects the last join of the context cascade of the frame, providing all direct data objects of the frame and the additional join node of its parent. Thus, a simple mechanism to project the used context into the target node is provided, where mappings are used in a script by simply docking to the additional join node of the current frame. This way all data objects of the frame as well as of all its parents are available.

Going back to FIG. 2, when the process-flow token showing the execution progress reaches the dynamic loop activity 205, start event 210 is triggered to create a main frame object, e.g., frame admiral 215. The frame admiral 215 object is a child object of the process-flow instance. A number of data objects local to the frame admiral object 215 data context may be instantiated. For example, a list data object (DO) 220 is generated including a record for every recurrence of a repetitive task included in the dynamic loop activity 205. The exact number of recurrences of the repetitive task may result from an evaluation of a list-valued expression based on a current runtime data context. Each record of list DO 220 may specify parameters for a concrete iteration of the dynamic loop activity 205. For example the records may include the amounts and the recipient account numbers in a group money transfer loop operation.

In one embodiment, based on the records of list DO 220, a number of subflows are spawned to execute a recurring activity or task of the dynamic loop cycle 205. The exact number of simultaneously instantiated subflows may depend on the list DO 220 cardinality. Further, the number of subflows may depend on the currently available system resources of the runtime. The subflows are instantiated when start events 240, 260 and 280 are triggered, e.g. when the list DO 220 is generated. A parallel cycle of a dynamic loop activity is represented by an embedded subflow process containing start event, end event and the recurrent activity, according to one embodiment. List cycle frame objects 242, 262 and 282 are generated nested in the frame admiral object 215 to enclose the instantiated parallel subflows. The number of simultaneously generated list cycle frame objects is limited by the cardinality of the list DO 220, but at least one list cycle frame object is generated, e.g., at least one subflow is instantiated. In one embodiment, so called "zero frames" are possible when the list DO 220 is empty. Hence, no execution is necessary and the process-flow continues.

In each of the parallel loop cycle frame objects 242, 262 and 282, a corresponding local line item DO 250, 270 and 290, respectively, is generated to store data for the particular recurrence of the repetitive activity. Each of the line item data objects 250, 270 and 290 may correspond to a record in the list DO 220. When any of the loop cycle frame objects 250, 270 or 290 is created, and the pertinent local line item DO 290, 270 or 290 is instantiated, a corresponding start event 244, 264 or 284 triggers an execution of an instance of the repetitive activity 246, 266 or 286. When the repetitive activity 246, 266 or 286 is executed, an end event 248, 268 or 288 occurs in the corresponding loop cycle frame object 242, 262 or 282, and the loop cycle frame object 242, 262 or 282, respectively, is deleted.

Loop counter DO 225 store the number of completed subflows, e.g., the loop counter DO 225 may be increased with one unit each time an end event 252, 272 or 292 is encountered. Similarly, each time an end event 252, 272 or 292 corresponding to loop cycle frame object 242, 262 or 282 deletion occurs, an expression in end condition DO 230 may be evaluated to decide whether to continue with the processing of the spawned subflows. In one embodiment, a loop cycle is seen as completed and the counter is increased as soon as a first token associated with the loop cycle reaches a corresponding end event 252, 272 or 292. In case of an embedded subflow, end event could be reached multiple times without increasing the counter. In such a case the associated token is simply ignored.

End event 295 is triggered when the recurrent loop activities of the dynamic loop activity 205 are executed, e.g., when the condition of end condition DO 230 is satisfied, or when the execution of the dynamic loop activity 205 is interrupted. Accordingly, process-flow execution token leaves admiral frame 215 and dynamic loop activity 205 to assign a successive process activity for execution.

In one embodiment, frame admiral 215 may not own list DO 220. An expression leading to generating of a list-based object is evaluated on start event 210. The list-based object is immediately split into line item data objects. The list-based object is deleted and only the line item data objects remain. Once a processor takes up a line item to process, ownership changes to the respective loop cycle frame object.

In one embodiment, there are several model elements that cause a token to leave a current frame. If the token reaches an end event, the token will follow the outgoing flow of the surrounding process-flow instance. Therefore the token frame attribute has to be set accordingly to the frame along with the new state of the token. For example, if a token reaches end event 252, loop cycle frame 242 is deleted and the token frame attribute is changed to frame admiral 215. Alternatively, a token reaching a terminating end event simply will result in deleting the process-flow instance object. All other existing objects of the process-flow instance are then automatically destroyed. In one embodiment, an error end event may lead to propagation of an exception across nested subflows until handled by a boundary event or a default handler. The subflows the exception which crosses during its propagation will be terminated together with their child subflows, if any. Respectively, the frames holding the terminated subflows will be cleared.

Figure 3:
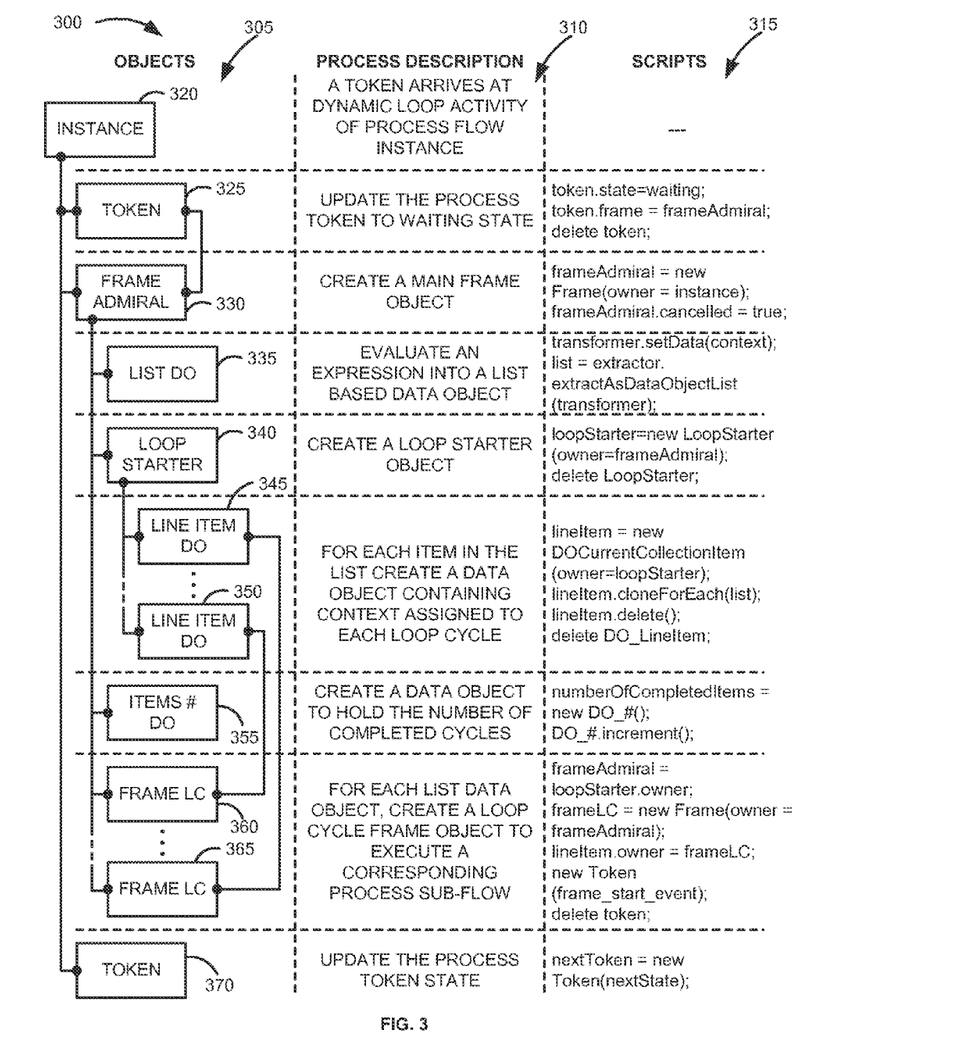
FIG. 3 is a block diagram illustrating dynamic parallel looping in process runtime, according to one embodiment.

Another abstraction of the dynamic parallel looping in process runtime is illustrated by block diagram 300 in FIG. 3. The block diagram 300 is organized in three areas, including objects area 305, process description area 310 and scripts area 315. Objects area 305 shows a hierarchy of objects, including frames and data objects, as instantiated and used during the dynamic parallel looping. The process description area 310 specifies the dynamic parallel looping activities as related to the separate objects, and the scripts area 315 shows exemplary scripts executed by a business process runtime to perform the dynamic parallel looping, according to one embodiment.

Process-flow instance 320 is executed in the business process runtime, when token 325 showing the execution progress arrives at a dynamic loop activity, triggering the start of the loop. An enclosing frame admiral object 330 is created as well as a loop starter object 340. An expression associated with the dynamic loop activity is evaluated into a list data object 335. For each entry of this list DO 335 a current line item DO of line item data objects 345-350 is created, containing the content assigned to each loop cycle. Additionally, one items # DO 355 is created holding the number of already completed loop cycles. The process token 325 is updated to a waiting state, and the frame attribute of token 325 is set to a reference to frame admiral object 330, according to one embodiment.

The created line item data objects 345-350 joined with the loop starter DO 340 will trigger one loop cycle per a line item DO. The resulting business runtime script creates a new loop cycle frame objects 360-365 with the frame admiral 330 as parent. Further, the owner attribute of each of the line item DOs 345-350 is updated to the corresponding newly created frame of the loop cycle frames 360-365. In one embodiment, a new sub-token may be created for every loop cycle, and set to the start event of the corresponding loop cycle frame 360-365. The resulting loop cycles enclosed in the loop cycle frames 360-365 are executed in parallel, according to a set of rules corresponding to the specific repetitive activity.

In one embodiment, when a sub-token reaches the end event of a loop cycle, it is checked with help of a filter node whether the compound activity end event has already been reached. If it is reached, in this case, the completed attribute of the corresponding loop cycle frame object 360-365 is true. If not, the increment script is triggered which increases the items # data object 355 and sets the completed attribute of the instant loop cycle frame 360-365 to true. The sub-token reaching the end event of the loop cycle is consumed and can therefore be deleted. If the evaluation of the completed attribute in the filter node evaluates to true, it means that one sub-token already has reached the end event of this loop cycle. For example, adding a multi instance characteristic to an embedded subflow may split the execution branch. In this case, the first sub-token to reach the end event renders the loop cycle completed and increments the items # data object 355. The rest of the sub-tokens may be ignored, triggering a handle subsequent script to simply delete them.

As soon as the generated frame objects 360-365 are completed, a regular activity completion script is triggered, according to one embodiment. This script sets a canceled attribute of the frame admiral object 330 to true which will trigger a regular cleanup of the enclosed objects. Further, the token 325 may be deleted and a new token 370 may be created with a state of an outbound connector of the dynamic loop activity. Alternatively, the state of the token 325 may be updated directly to the outbound connector of the dynamic loop activity.

The provided exemplary scripts in scripts area 315 illustrate the described operations pertinent to the corresponding objects. The scripts are written using simplified syntax. However, with little changes, they can be executed in a standard rule-based engine implemented in a business process runtime environment.

Figure 4:
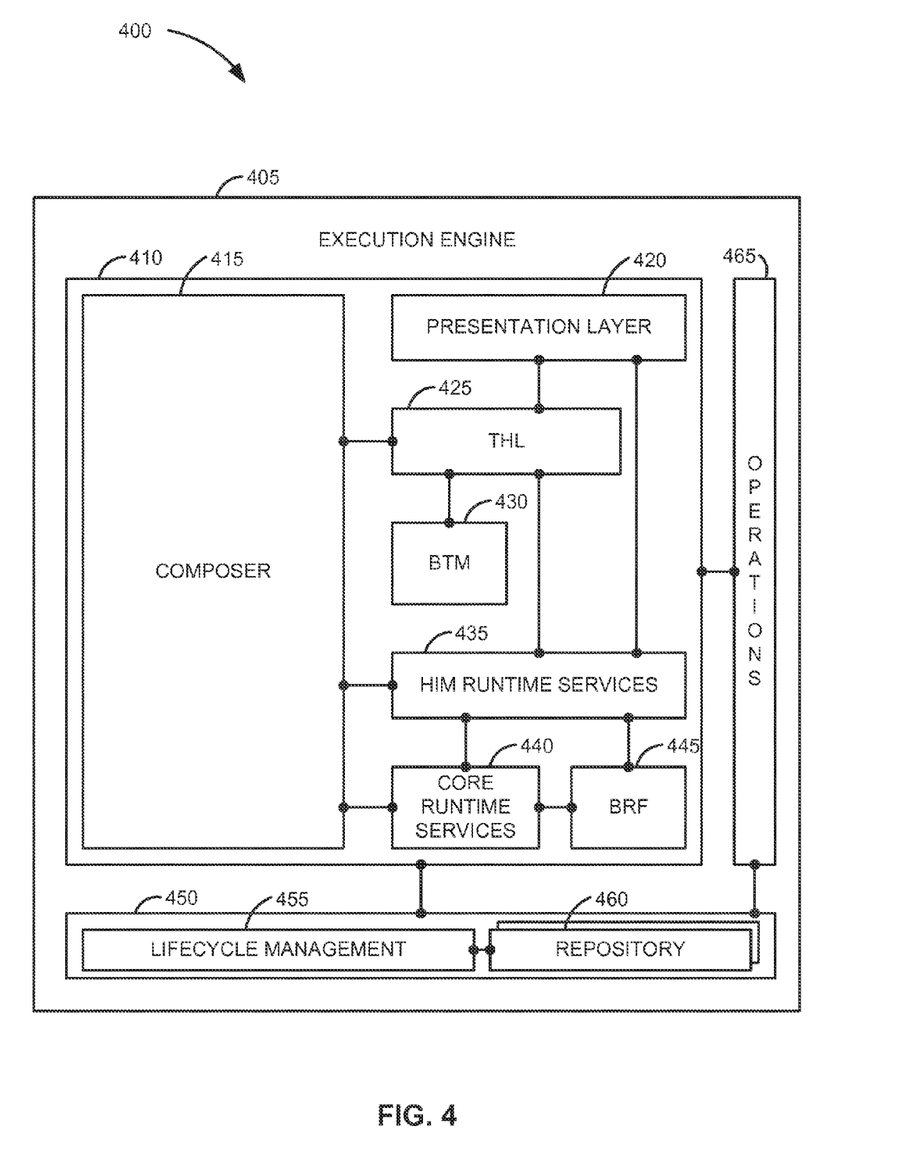
FIG. 4 is a block diagram illustrating basic building blocks of a business process execution engine, according to one embodiment.

FIG. 4 is a block diagram 400 showing basic building blocks of a business process execution engine 405. The execution engine 405 is implemented in a runtime environment and executes parallel dynamic loops, according to one embodiment. The building blocks of the execution engine 405 are presented according to NetWeaver™ architecture introduced by SAP AG Company. More specifically, the building blocks are part of NetWeaver™ Business Process Execution Management (BPEM) package. The complete BPEM package may depend and utilize the NetWeaver™ Java™ stack and NetWeaver™ ABAP™ stack. For example, core components like core runtime services 440 and human interaction management (HIM) runtime services 435 may depend on the Java™ Enterprise Edition (Java EE™) engine, whereas business task management (BTM) 430 and task harmonization layer (THL) 425 components may depend and utilize the NetWeaver™ ABAP™ environment.

In one embodiment, composer component 415 is part of the execution engine 405 main components grouped in 410. The composer 415 provides designtime environment for modeling business processes and activities, as well as other process and task related artifacts, e.g., events and gateways. The composer 415 may support BPMN standard for business process modeling. Particularly, composer 415 may be integrated into the NetWeaver™ Development Studio and utilizes the implemented modeling and development infrastructures.

The core runtime services 440 are basically responsible for executing a deployed process model. The core runtime services 440 are mainly processing so called trigger networks. In one embodiment, trigger networks use an internal representation which differs from the BPMN definitions. The artifacts within a trigger network are much more fine granular and can be combined arbitrarily to form a certain function or decision. A compiler generates the trigger networks automatically from the BPMN model. It is also possible to use the core runtime services 440 to execute workflows modeled in other notations (e.g. BPEL), understandable for the compiler. The core runtime services 440 can be also used to execute other paradigms than workflows, e.g., event compositions. In one embodiment, a plug-in mechanism provides extensions to the core runtime services 440 kernel. For example, a BPMN adapter may provide a BPMN layer on top of the trigger networks to translate between internal trigger network artifacts and their corresponding BPMN elements. This extensibility mechanism allows adding more and new functionality to enrich the capabilities of the core runtime services 440 without program code changes.

The presentation layer 420 includes user interface (UI) related functionality to either display a process model, or to let the process participant interact with the HIM runtime services 435. The presentation layer 420 provides UI components utilizing public Application Programming Interfaces (APIs) that are exposed to different services. Such an approach allows customers and external software vendors to create their own UI components using the public APIs. The HIM runtime services 435 provide task, process and context management capabilities to let process participants interact with running process and task instances. HIM runtime services 435 and the core runtime services 440 communicate with business rules framework 445 to ensure consistent execution of the running process-flow instances. The THL 435 is used to consolidate various kinds of tasks from different provider systems, to ensure common interfaces to task consumers, and common generic services on all kinds of tasks. The BTM 430 generally administers the generated process tasks.

Operations component 465 mainly includes relevant contributions to the NetWeaver™ administrative environment that allows process administrators to control deployed and running processes, e.g., to detect and resolve errors, to set priorities, etc. Life cycle management 455 and repository 460 components grouped in 450 manage and store metadata for active, or simply deployed, artifacts of business process models.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 5:
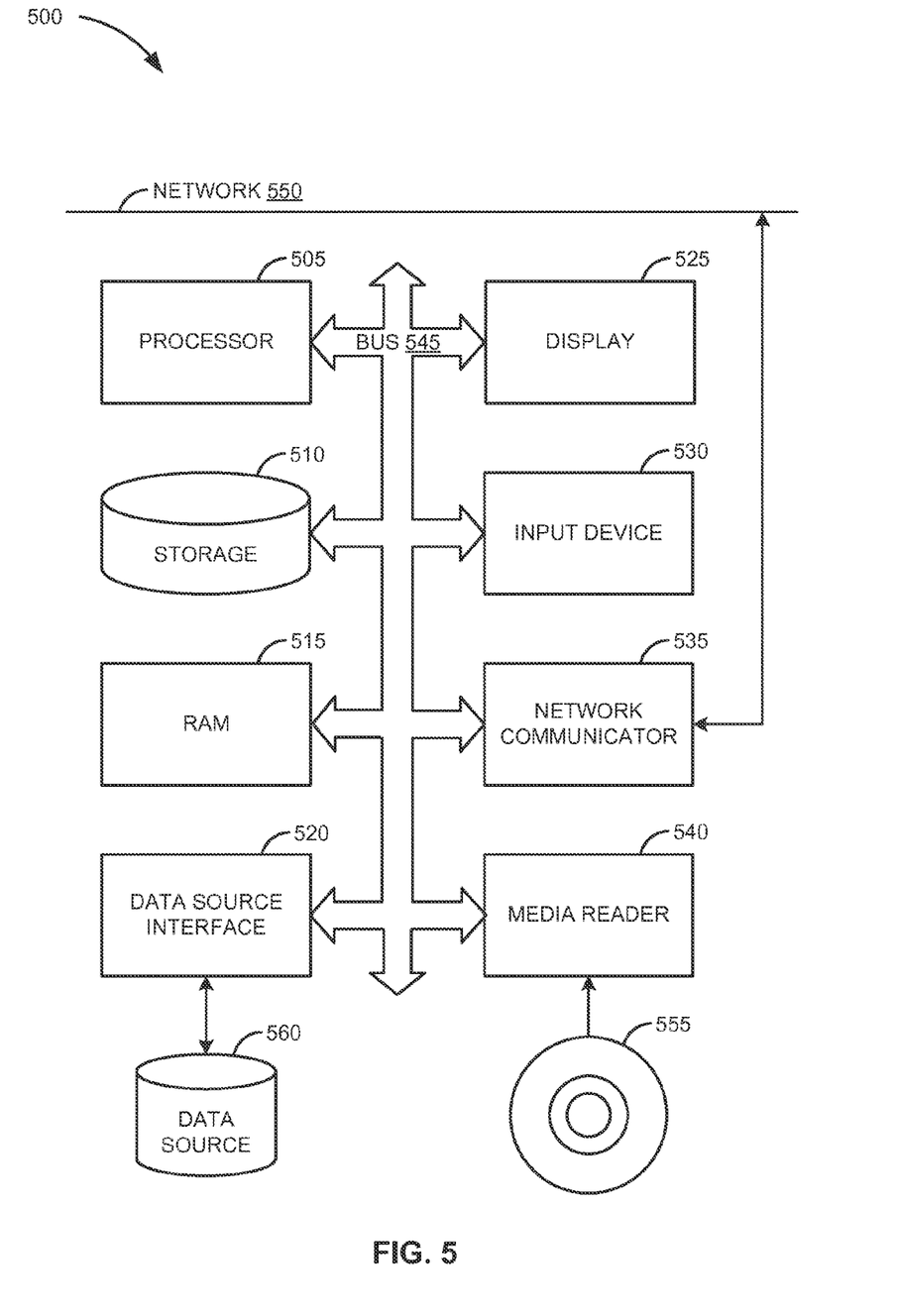
FIG. 5 is a block diagram of an exemplary computer system to perform dynamic parallel looping in a process runtime environment, according to one embodiment of the invention.

FIG. 5 is a block diagram of an exemplary computer system 500. The computer system 500 includes a processor 505 that executes software instructions or code stored on a computer readable storage medium 555 to perform the above-illustrated methods of the invention. The computer system 500 includes a media reader 540 to read the instructions from the computer readable storage medium 555 and store the instructions in storage 510 or in random access memory (RAM) 515. The storage 510 provides a large space for keeping static data where at least some instructions could be stored for later execution. The stored instructions may be further compiled to generate other representations of the instructions and dynamically stored in the RAM 515. The processor 505 reads instructions from the RAM 515 and performs actions as instructed. According to one embodiment of the invention, the computer system 500 further includes an output device 525 (e.g., a display) to provide at least some of the results of the execution as output including, but not limited to, visual information to users and an input device 530 to provide a user or another device with means for entering data and/or otherwise interact with the computer system 500. Each of these output devices 525 and input devices 530 could be joined by one or more additional peripherals to further expand the capabilities of the computer system 500. A network communicator 535 may be provided to connect the computer system 500 to a network 550 and in turn to other devices connected to the network 550 including other clients, servers, data stores, and interfaces, for instance. The modules of the computer system 500 are interconnected via a bus 545. Computer system 500 includes a data source interface 520 to access data source 560. The data source 560 can be accessed via one or more abstraction layers implemented in hardware or software. For example, the data source 560 may be accessed via network 550. In some embodiments the data source 560 may be accessed by an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. An article of manufacture including a non-transitory computer readable storage medium to tangibly store instructions, which when executed by a computer, cause the computer to:
   process a dynamic loop activity of an instance of a process-flow, currently executed in a process runtime environment, wherein the process-flow comprises a plurality of successive process activities including the dynamic loop activity, and wherein the dynamic loop activity comprises a repetitive task, wherein the processing of the dynamic loop activity comprises:
   evaluating an expression modeled in the process-flow to determine a number of recurrences of the repetitive task, based on a current state of the process runtime environment;
   generating a list of activities by the computer, wherein each activity of the list of activities corresponds to a recurrence of the repetitive task, and wherein a cardinality of the list of activities corresponds to the determined number of recurrences of the repetitive task;
   spawning a plurality of subflows of the instance of the process-flow, wherein a subflow corresponds to an activity of a number of activities of the list of activities;
   executing in parallel the number of activities of the list of activities, wherein the number of the activities executed in parallel depends on system resources currently available in the process runtime environment;
   for an activity of the list of activities, generating a response status variable to carry result data from an execution of the activity of the list of activities;
   upon completion of the execution of the activity of the list of activities, evaluating an end expression based on the result data from the execution of the activity to verify a completion condition for the dynamic loop activity; and
   upon verification of the completion condition, aborting an execution of at least one activity of the list of activities when the execution of the at least one activity is running, and coordinating results of the parallel execution of the number of activities to complete the dynamic loop activity.

2. The article of manufacture of claim 1, wherein processing the dynamic loop activity of the process-flow instance comprises:
   updating a token associated with a progress of the entire process-flow instance processing upon arrival at the dynamic loop activity, wherein the token is updated in response to a completion of a process activity of the plurality of process activities preceding the dynamic loop activity in the process-flow instance, and wherein the token is updated to prevent an execution of a process activity of the plurality of successive process activities, following the dynamic loop activity in the process-flow instance.

3. The article of manufacture of claim 1, wherein processing the dynamic loop activity of the process-flow instance comprises:
   evaluating the expression modeled in the process-flow based on a current data context of the process-flow instance, wherein the current data context includes a current value of a data object of the process-flow.

4. The article of manufacture of claim 1, wherein the non-transitory computer readable storage medium tangibly stores further instructions, which when executed by a computer cause the computer to:
   create a frame object to provide runtime support for simultaneously spawning the plurality of subflows, wherein the frame object is a child object of the process-flow instance; and
   create a loop object to provide runtime support for processing a subflow of the plurality of subflows, wherein the loop object is child object of the frame object.

5. The article of manufacture of claim 1, wherein evaluating an end expression comprises:
   incrementing a counter when the execution of the activity of the list of activities is completed; and
   comparing the counter with the cardinality of the list of activities to identify when the dynamic loop activity is completed.

6. The article of manufacture of claim 1, wherein the non-transitory computer readable storage medium tangibly stores further instructions, which when executed by a computer cause the computer to:
   setup a token associated with a progress of the process-flow instance processing to initiate an execution of a process activity of the plurality of successive process activities, following the dynamic loop activity in the process-flow instance.

7. A computerized method for parallel looping in a process runtime environment comprising:
   processing a dynamic loop activity of an instance of a process-flow, currently executed in the process runtime environment, wherein the process-flow comprises a plurality of successive process activities including the dynamic loop activity, and wherein the dynamic loop activity comprises a repetitive task, wherein the processing of the dynamic loop activity comprises:
   evaluating a predefined expression based on a current state of the process runtime environment, wherein the result of the evaluation indicates a number of recurrences of the repetitive task;

generating a list of activities by a processor, wherein each activity of the list of activities corresponds to a recurrence of the repetitive task, and wherein a cardinality of the list of activities corresponds to the indicated number of recurrences of the repetitive task;

spawning a plurality of subflows of the instance of the process-flow, wherein a subflow corresponds to an activity of a number of activities of the list of activities;

executing in parallel the number of activities of the list of activities, wherein the number of the activities executed in parallel depends on system resources currently available in the process runtime environment;

for an activity of the list of activities, generating a response status variable to carry result data from an execution of the activity of the list of activities;

upon completion of the execution of the activity of the list of activities, evaluating an end expression based on the result data from the execution of the activity to verify a completion condition for the dynamic loop activity; and upon verification of the completion condition, aborting an execution of at least one activity of the list of activities when the execution of the at least one activity is running, and synchronizing results of the parallel execution of the number of activities to complete the dynamic loop activity.

8. The method of claim 7, wherein processing the dynamic loop activity of the process-flow instance comprises:

updating a token associated with a progress of the entire process-flow instance processing upon arrival at the dynamic loop activity, wherein the token is updated in response to a completion of a process activity of the plurality of process activities preceding the dynamic loop activity in the process-flow instance, and wherein the token is updated to prevent an execution of a process activity of the plurality of successive process activities, following the dynamic loop activity in the process-flow instance.

9. The method of claim 7, wherein processing the dynamic loop activity of the process-flow instance comprises:

translating the dynamic loop activity to at least one event-condition-action rule to be executed as a trigger network in a rule-based runtime environment.

10. The method of claim 7, wherein evaluating the end expression comprises:

incrementing a counter when the activity of the list of activities is completed; and comparing the counter with the number of recurrences to identify when the dynamic loop activity is completed.

11. The method of claim 7, wherein synchronizing the parallel execution comprises:

upon encountering an exception, error or cancelation during the execution of the dynamic loop activity, aborting an execution of at least one activity of the list of activities when the execution of the at least one activity is running; and upon encountering an exception, error or cancelation during the execution of the dynamic loop activity, canceling an execution of one or more activities of the list of activities when the execution of the one or more activities of the list of activities is pending.

12. A system for performing parallel looping during an execution of a process-flow, the system comprising:

a memory to store computer instructions; and a processor coupled to the memory to execute the computer instructions to:

establish a trigger network based process runtime environment, and process a dynamic loop activity of the process-flow, the process-flow comprises a plurality of successive process activities including the dynamic loop activity, wherein the dynamic loop activity comprises a repetitive task, wherein the processing of the dynamic loop activity comprises:

evaluating an expression based on a current state of the process runtime environment, wherein the result of the evaluation discovers a number of recurrences of the repetitive task;

generating a list of activities, wherein an activity of the list of activities corresponds to a recurrences of the repetitive task, and wherein a cardinality of the list of activities is determined by the number of recurrences of the repetitive task, spawning a plurality of subflows of the process-flow, wherein a subflow corresponds to an activity of a number of activities of the list of activities;

executing in parallel the number of activities of the list of activities, wherein the number of the activities executed in parallel depends on system resources currently available in the process runtime environment;

for an activity of the list of activities, generating a response status variable to carry result data from an execution of the activity of the list of activities;

upon completion of the execution of the activity of the list of activities, evaluating an end expression based on the result data from the execution of the activity to verify a completion condition for the dynamic loop activity; and upon verification of the completion condition, aborting an execution of at least one activity of the list of activities when the execution of the at least one activity is running, and harmonizing results of the parallel execution of the number of activities to complete the dynamic loop activity.

13. The system of claim 12, wherein generating the list of activities comprises:

evaluating the expression based on a current data context of the process-flow, wherein the current data context includes a current value of a data object of the process-flow.

14. The system of claim 12, wherein the memory comprises:

a core runtime services module to interpret a business process model of the process-flow as a trigger network.

15. The system of claim 12, wherein the memory comprises:

a human interaction management runtime services module to provide user interface functionality supporting user interaction with the process-flow processing.

16. A computerized method for parallel looping in a process runtime environment comprising:

processing a dynamic loop activity of an instance of a process-flow, currently executed in the process runtime environment, wherein the process-flow comprises a plurality of successive process activities including the dynamic loop activity, and wherein the dynamic loop activity comprises a repetitive task, wherein the processing of the dynamic loop activity comprises:

evaluating a predefined expression based on a current state of the process runtime environment, wherein the result of the evaluation indicates a number of recurrences of the repetitive task;

generating a list of activities by a processor, wherein each activity of the list of activities corresponds to a recurrence of the repetitive task, and wherein a cardinality of the list of activities corresponds to the indicated number of recurrences of the repetitive task;

setup a token to waiting state associated with a progress of the process-flow instance processing to initiate execution of a process activity of the plurality of successive process activities, and update the process token state following the dynamic loop activity in the process-flow instance;

executing in parallel a number of activities of the list of activities, wherein the number of the activities executed in parallel depends on system resources currently available in the process runtime environment;

for an activity of the list of activities, generating a response status variable to carry result data from an execution of the activity of the list of activities;

upon completion of the execution of the activity of the list of activities, evaluating an end expression based on the result data from the execution of the activity to verify a completion condition for the dynamic loop activity; and upon verification of the completion condition, aborting an execution of at least one activity of the list of activities when the execution of the at least one activity is running, and synchronizing results of the parallel execution of the number of activities to complete the dynamic loop activity.

* * * * *